(12) United States Patent
Hall et al.

(10) Patent No.: US 7,277,817 B2
(45) Date of Patent: Oct. 2, 2007

(54) POSITION SENSING DEVICE

(75) Inventors: Bernard J. Hall, Elizabeth, NJ (US);
Francois B. Kapp, Kommetjie (ZA)

(73) Assignee: Ethertouch Limited, Lubuan (MY)

( * ) Notice: Subject to any disclaimer, the term of this patent is extended or adjusted under 35 U.S.C. 154(b) by 0 days.

(21) Appl. No.: 10/995,778

(22) Filed: Nov. 22, 2004

(65) Prior Publication Data

US 2005/0109125 A1    May 26, 2005

Related U.S. Application Data

(60) Provisional application No. 60/524,170, filed on Nov. 21, 2003.

(51) Int. Cl.
*G01C 9/00* (2006.01)
(52) U.S. Cl. ...................................... 702/150
(58) Field of Classification Search ................. 702/150
See application file for complete search history.

(56) References Cited

U.S. PATENT DOCUMENTS

| | | | | |
|---|---|---|---|---|
| 4,284,947 A | * | 8/1981 | Walton | ......................... 324/671 |
| 5,008,497 A | * | 4/1991 | Asher | ....................... 178/18.05 |
| 5,149,919 A | * | 9/1992 | Greanias et al. | ......... 178/18.02 |
| 5,159,159 A | * | 10/1992 | Asher | ....................... 178/18.05 |

* cited by examiner

*Primary Examiner*—John Barlow
*Assistant Examiner*—Aditya S. Bhat
(74) *Attorney, Agent, or Firm*—Reed Smith, LLP (57) ABSTRACT

A position sensing device having an insulating board, a first conductive sensing element, a second conductive sensing element, an oscillator, conductive material, a differential amplifier, and a processor. The first and second spaced conductive sensing elements are on the insulating board. The oscillator generates an oscillating signals and the conductive material is spaced from the sensing elements. The conductive material receives the oscillating signal to create an electric field between the conductive material and the first and second sensing elements. The differential amplifier includes differential inputs that are connected to the conductive sensing elements. The signal levels at the differential inputs vary based on the position of a pointing object of a user relative to the first and second conductive sensing elements. The processor generates a position signal based on an output of the differential amplifier.

31 Claims, 9 Drawing Sheets

//  POSITION SENSING DEVICE

CROSS REFERENCE TO RELATED APPLICATIONS

This application claims priority under 35 U.S.C. § 119 (e) to U.S. provisional patent application No. 60/524,170, filed Nov. 21, 2003, which is hereby incorporated by reference.

FIELD OF THE INVENTION

The present invention relates to an input device. In particular, the present invention relates to a position sensing device for electronic devices.

BACKGROUND OF THE INVENTION

Various position sensing input devices are used today to allow an operator to interface with electronic devices such as a computer, PDA, mobile telephones, pocket organizers, portable gaming devices and the like. For instance, a cursor controlled by a mouse has become a necessary tool of the modern computer system. The mouse allows the operator to both operate the movement of an on-screen cursor and execute commands. However, a relatively large input device such as the mouse is impractical to be incorporated into small portable electronic devices. Moreover, such mechanically complex input device is expensive to manufacture and prone to breakage.

Therefore, it is desirable to provide a position sensing device that is accurate and yet small, durable and inexpensive to manufacture.

SUMMARY OF THE DISCLOSURE

According to the invention there is provided a position sensing device having an insulating board, a first conductive sensing element positioned on the insulating board and a second conductive sensing element positioned on the insulating board and spaced from the first conductive sensing element. An oscillator is also provided for generating an oscillating signal. Conductive material spaced from the conductive sensing elements is operable to receive the oscillating signal to create an electric field with the first and second conductive sensing elements. A differential amplifier having first and second differential inputs connected to the first and second conductive sensing elements is also provided. The signal levels at the differential inputs vary based on the position of a pointing object of a user relative to the first and second conductive sensing elements. A processor generates a position signal based on an output of the differential amplifier.

According to one embodiment of the invention, the first and second conductive sensing elements include a pair of elongated conductive triangular wedges facing each other.

According to another embodiment of the invention, the first conductive sensing element includes a plurality of spaced conductive pads that increase in size in a first direction. The second conductive sensing elements include a plurality of spaced conductive pads that are alternately positioned with the conductive pads of the first conductive sensing elements and that decrease in size in the first direction.

In a third embodiment of the invention, the first conductive sensing element includes a first set of curved conductors electrically coupled to each other. The second conductive sensing elements include a second set of curved conductors electrically coupled to each other and spaced from the first set.

DETAILED DESCRIPTION OF THE INVENTION

Figure 1:
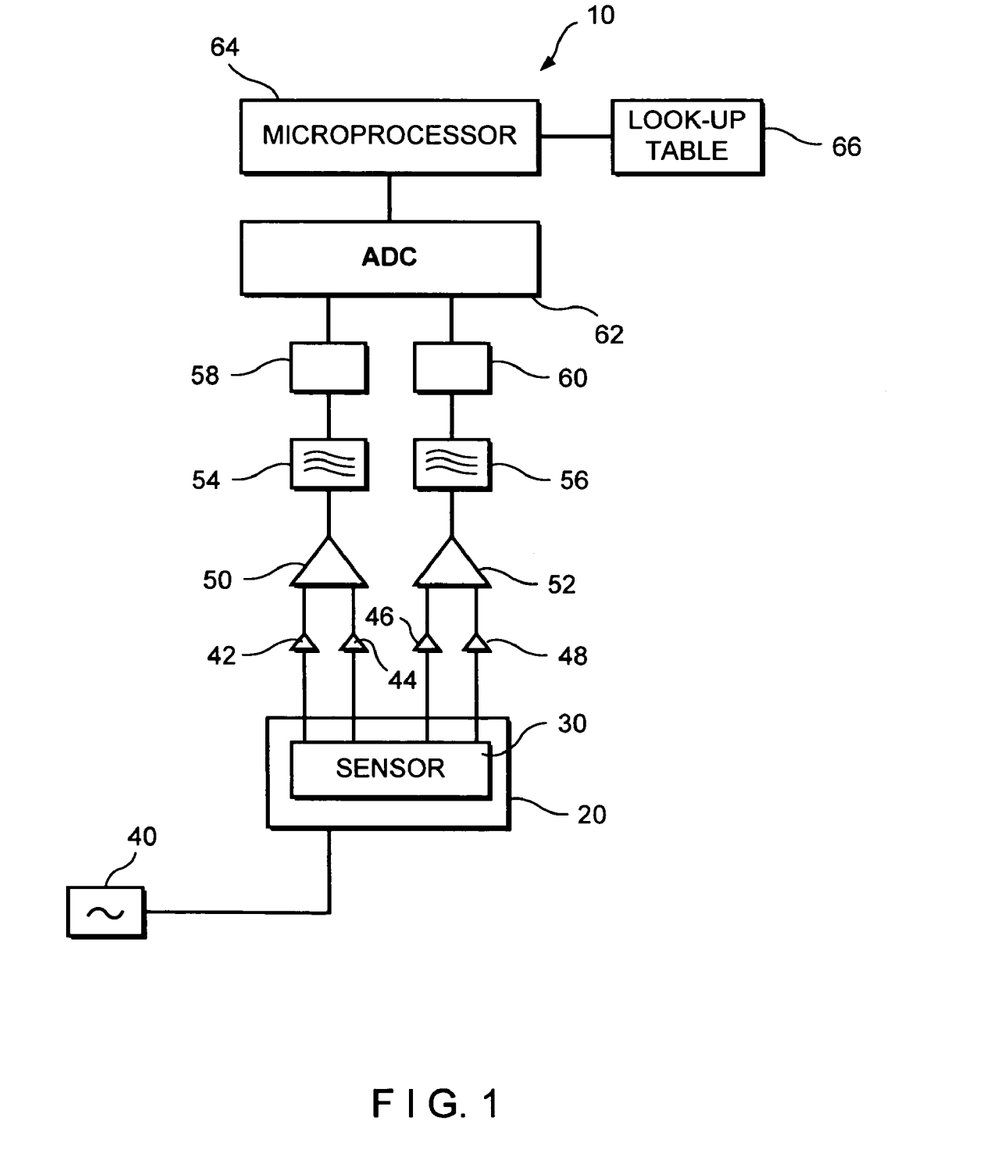
FIG. 1 is an exemplary schematic block diagram of a position sensing system in accordance with a present invention.

Referring first to FIG. 1, reference numeral 10 generally designates a position sensing device comprising an insulating board 20 attached to a conductive layer. The conductive layer (see 32 in FIG. 2, for example) is below the insulating board 20. The insulating board 20 may be part of a keyboard, mobile telephone, PDA or any other such device which may receive input from a user. In the present system 10, the conductive layer receives an oscillating signal (AC Voltage) from an oscillator 40. Generally the oscillating frequency transmitted to the conductive layer is in the range of 1-100 KHz, and preferably about 20 KHz.

A sensor or sensing element 30 is positioned on the insulating board 20. The sensor 30 may consist of a series of conductive sensing elements positioned in varying arrangements on the insulating board 20. The varying arrangements will be discussed in further detail later herein. When an oscillating signal is applied to the conductive layer, an electric field is created between the conductive layer positioned below the insulating board 20 and the conductive sensing elements 30. The voltage and current that flows from the conductive sensing elements of the insulating board 20 to the conductive sensing elements of the sensor 30 can be measured.

The electric field can be disturbed by a body part such as a finger or any other pointing object utilized by an operator, thereby interfering with the current that flows from the conductive layer to the conductive sensing elements 30. High impedance buffer differential amplifiers 42, 44 are connected to the outputs of the conductive sensing elements corresponding to x-axis data. The output from the high impedance buffer differential amplifier 42 and 44 are then inputted into a difference amplifier 50. The output of the difference amplifiers 50 is fed via band-pass filters 54 and a synchronous demodulator/detector 58 to a first of the inputs of an analog-to-digital converter (ADC) 62. Conductive sensing elements corresponding to y-axis data are connected to the two inputs, respectively, via a high impedance buffer amplifier 46 and 48, and the output of the difference amplifier 52 is connected via a band-pass filter 56 and a synchronous demodulator/detector 60 to a second input of the analog-to digital converter 62. The band-pass filters 54 and 56 each have a centre frequency which corresponds to the frequency of the oscillator 40. The sensing system 10 also comprises a microprocessor 64. The output of the analog-to-digital converter 36 is connected to an input of the microprocessor 46. Other inputs such as a PDA or mouse may also be connected to the microprocessor 64. Subsequently, a look up table 66 is utilized to convert the voltage signal to position values.

The synchronous detector/demodulator is a demodulator that runs at the same frequency as the input frequency. The simplest form of this is a rectifier. In the embodiment shown, since the oscillating frequency is known, the synchronous demodulator uses a switch that switches from positive to negative at the zero crossings in the input signal. The output for a sinusoidal input signal is simply a rectified sinusoidal. This effectively performs a demodulation on the signal—transferring the useful information (amplitude in the present case) from a high frequency down to DC. The high oscillating frequency signal allows the signal to propagate through the capacitive coupling of the sensing elements allows the input amplifiers to operate in a relatively noise free frequency band. Thus, the synchronous demodulator enables easy determination of the signal amplitude by a standard analog to digital converter.

As mentioned above, conductive sensing elements positioned on the sensor 30 can be situated in an X co-ordinate direction or the Y co-ordinate direction. The X co-ordinate direction is along the length of the insulating board 20, and, as will be explained in more detail hereinafter, is thus able to detect the position of the operator's pointing object or body part in the X co-ordinate direction. The Y co-ordinate direction is in a direction perpendicular to the X co-ordinate direction. The sensor is able to detect the position of the operator's pointing object or body part (finger) in the Y co-ordinate direction.

The detection of the presence of a finger is performed by measuring the output of either conductive sensing element (x or y sensing element) or the output of the sum of the two sensing elements 30. When a finger is in close proximity to the sensors 30, the fields are interrupted and the total signal is reduced. A fixed or a noise riding threshold can be used to determine activation. Hysteresis can be used to reject spurious signals. This activation signal responds to approximately uniformly over the entire sensor area, and can generally be adjusted to be sensitive to actual touch of the dielectric surface only. In order to measure the signals accurately, a chip such as an AD7103 ASIC from Analog Devices, Inc. of Norwood, Mass. is used.

The conductive sensing elements are able to detect the strength (i.e. amplitude) of this field and, from this determine the position of the operator's right hand in the X and Y co-ordinate directions. This is done in conjunction with the difference amplifiers 50, 52 and the synchronous demodulators 58, 60. Any extraneous signals are filtered out by the band-pass filters 54 and 56 and the synchronous demodulators 58, 60 provide analog outputs corresponding to the position of the operator's right hand in, respectively, the X and Y co-ordinate directions. The two analog signals, one provided by the synchronous demodulator 58 and the other by the synchronous demodulator 60, are fed to the analog-to-digital converter 62, which converts the two signals to a digital form. The microprocessor 64 serves to convert the signal into a suitable data bit-stream. The protocol of the bit-stream may be such as to emulate a standard mouse protocol required by a conventional software mouse driver resident in a PC. The bit-stream is fed to a look up table 66 or the like, and is interpreted by the computer as if it was reading data sent by a conventional mouse during normal mouse operation.

Figure 2:
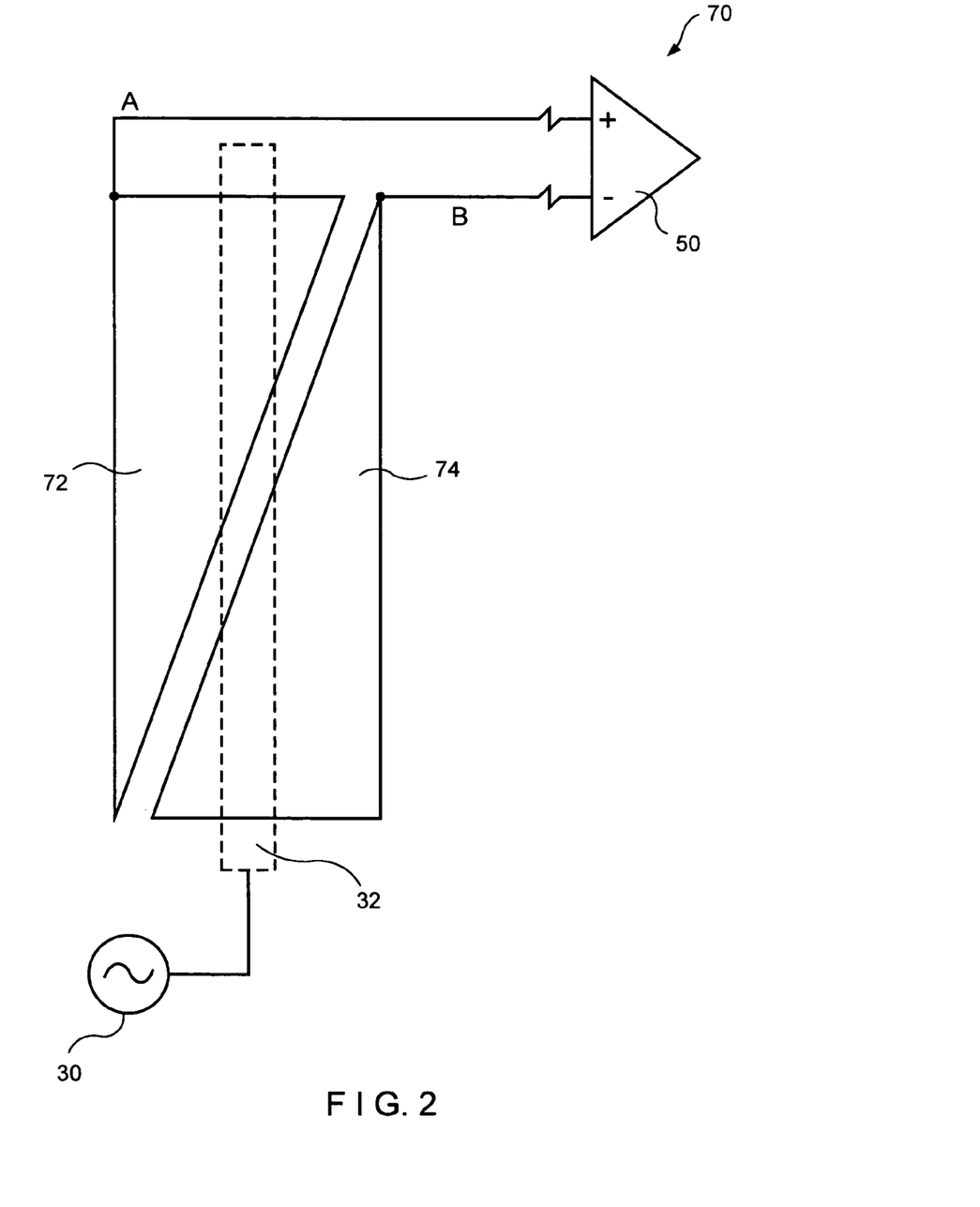
FIG. 2 illustrates the arrangement of conductive sensing elements in accordance with one embodiment of the invention.

Now referring to FIG. 2, the operation of the position sensing device 10 will be described according to one exemplary embodiment of the present invention. FIG. 2 illustrates the conductive sensing elements 72,74 formed in a triangular wedge arrangement 70 which comprise the sensing element 30. The oscillator 40 provides an oscillating signal to the conductive layer 32 positioned beneath the insulating board 20 (not shown). Complementary opposing conductive sensing elements 72 and 74 formed in a triangular wedge are positioned on the sensing device 30 above the insulating board 20. In a downward direction, conductive strip 72 decreases in width in a triangular format and conductive strip 74 increases as illustrated.

The conductive layer 32 receiving the oscillating signal from the oscillator 40 is in close proximity to and separated from the conductive sensing elements 72, 74 by a thin insulating board 20. Thus, oscillator field lines are generated from the conductive layer 32 to the conductive sensing elements 72, 74. When an operator places a pointing object such as his finger tip on the surfaces of the wedge shaped conductive sensing elements 72 and 74, simultaneous covering of portions of both conductive sensing elements results in interrupting the electric field coupling in that region of the wedge shaped conductive sensing elements. Although the finger can physically touch the conductive sensing elements 72,74, a thin insulation coating (see FIG. 6) in the embodiment shown isolates the finger from the conductive sensing elements.

Placing the pointing object or finger near the bottom of the sensor 30 results in covering a larger area of the wedge shaped conductive sensing elements 74 connected to input B and a smaller area of the conductive sensing element 72 connected to input A. This results in interrupting the field lines coupling to B in a far greater amount than that for input A. The result is that the input signal to A is now greater than the input to B causing the resulting output of the differential amplifier 50 to swing more positive if input A is the positive input to the differential amplifier 50. As the finger moves up along the wedge shaped conductive sensing elements, the amount of coverage decreases on the wedge shaped conductive sensing element 74 connected to B and increases on the wedge shaped conductive sensing element 72 connected to A. The resulting output due to the motion is to cause the output of the differential amplifier 50 to swing from positive to negative in a generally linear fashion.

Figure 3A:
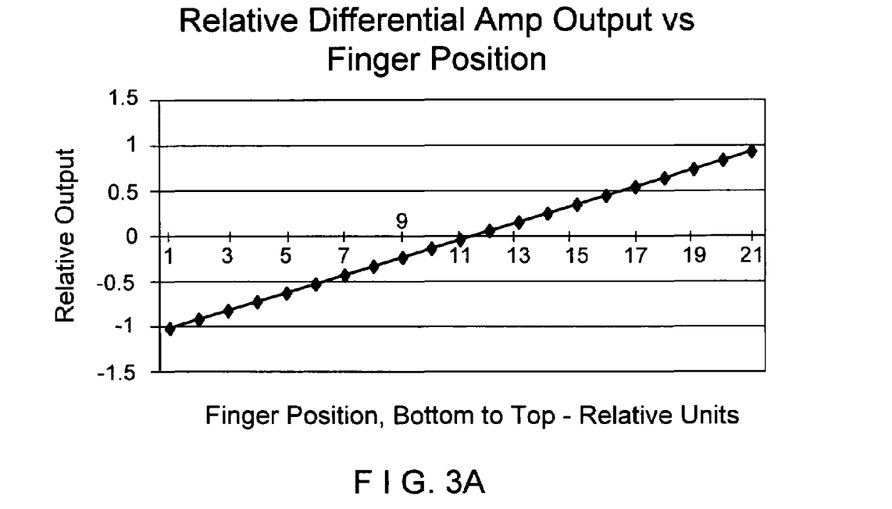
FIG. 3A is a graph showing the relative differential amplifier output versus the position of a pointing object according to the sensor arrangement of FIG. 2.

FIG. 3A is a graph illustrating the linear relationship between the output of the differential amplifier 50 and the finger position over the sensing device 70. As illustrated, as the finger is moved from the bottom of the sensing device at position 1 to the top at finger position 21, the output of the amplifier 50 increases from −1 to +1. As a result, the position of the finger can be accurately determined. The table of values used to generate the graph can be used as the look up table 66.

Figure 3B:
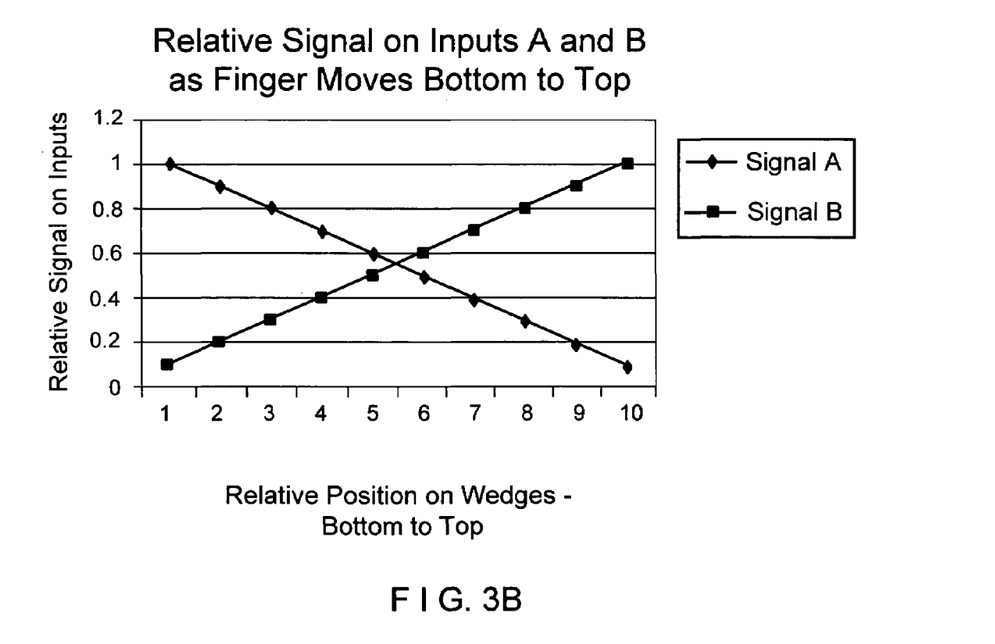
FIG. 3B is a graph showing the relative signal on the inputs to a differential amplifier according to the arrangement of FIG. 2 as a function of the position of a pointing object.

FIG. 3B illustrates a graph showing the relative signal on Inputs A and B as a finger moves from bottom to top. As the finger is moved from bottom to top, signal A increases from negative to positive, as signal B decreases from positive to negative in a generally linear fashion.

Figure 4:
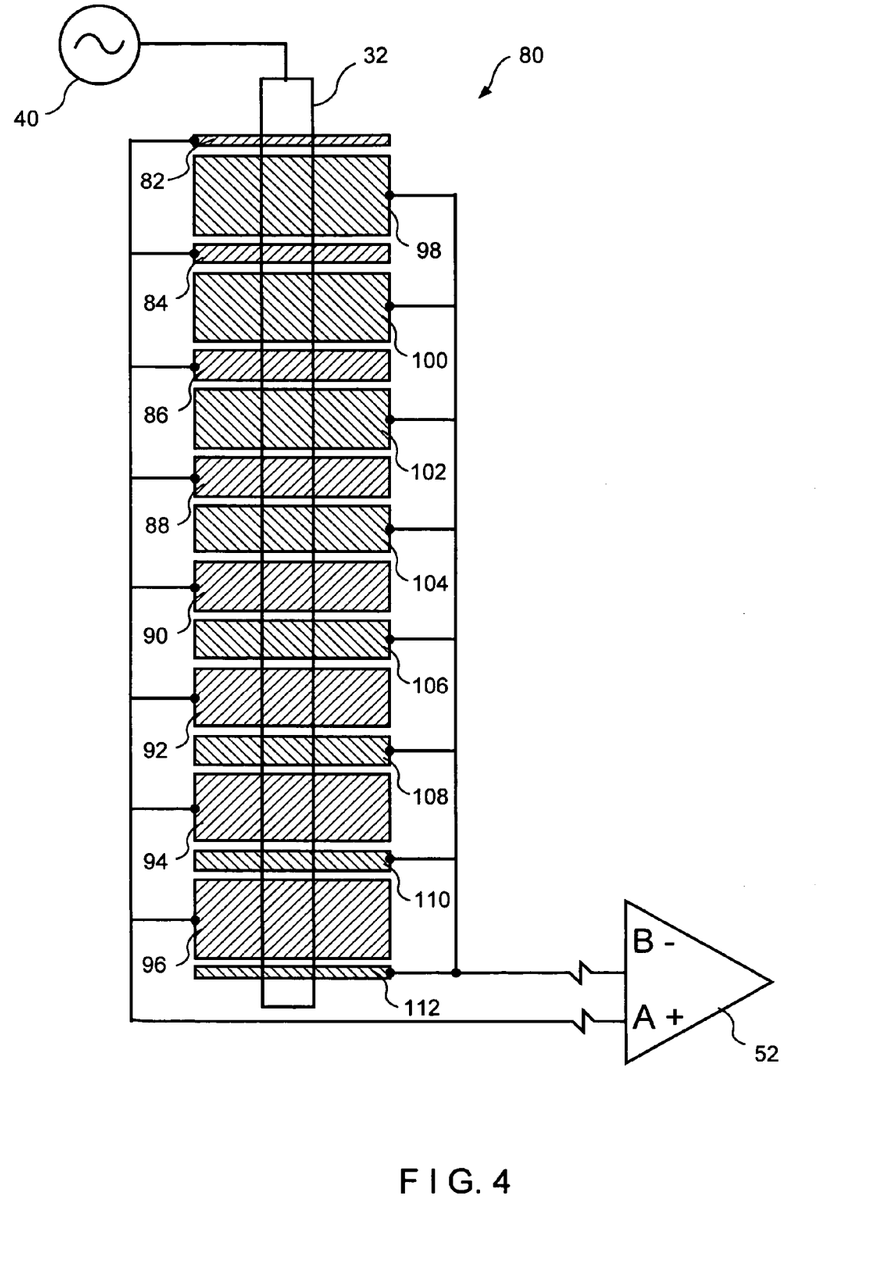
FIG. 4 shows the arrangement of conductive sensing elements in accordance with another embodiment of the invention.

Now turning to FIG. 4, an illustration of another embodiment of the present invention is shown. Specifically, FIG. 4 illustrates the conductive sensing elements 82-96 formed as rectangular strips 80 which comprise the sensing element 30. The oscillator 40 provides an oscillating signal to the conductive layer 32 positioned beneath the insulating board 20 (not shown). Conductive sensing elements 82-96 connected to one input of a differential amplifier 52 increase in size in a downward direction. Complementary conductive sensing elements 98-112 connected to the other input of the differential amplifier 52 decrease in size in a downward direction. The conductive sensing elements 82-96 are interposed with the conductive sensing elements 98-112 in an alternating manner.

As explained previously, signals are provided via an oscillator 40 to the rectangular shaped conducting layer 32, which is positioned below the conducting elements 82-112 and separated by a thin insulator. Thus, the oscillator field lines couple to the conductive sensing elements 82-112. Similar to the embodiment of FIG. 2, while the finger can physically touch the conductive sensing elements 82-112, a thin insulation coating (see FIG. 6) isolates the finger from the conductive sensing elements.

When an operator places a pointing object or finger on the surfaces of the sensor 30, simultaneously covering adjacent portions of each conductor results in interrupting the coupling in that region of the conductive sensing elements 82-112.

Figure 5:
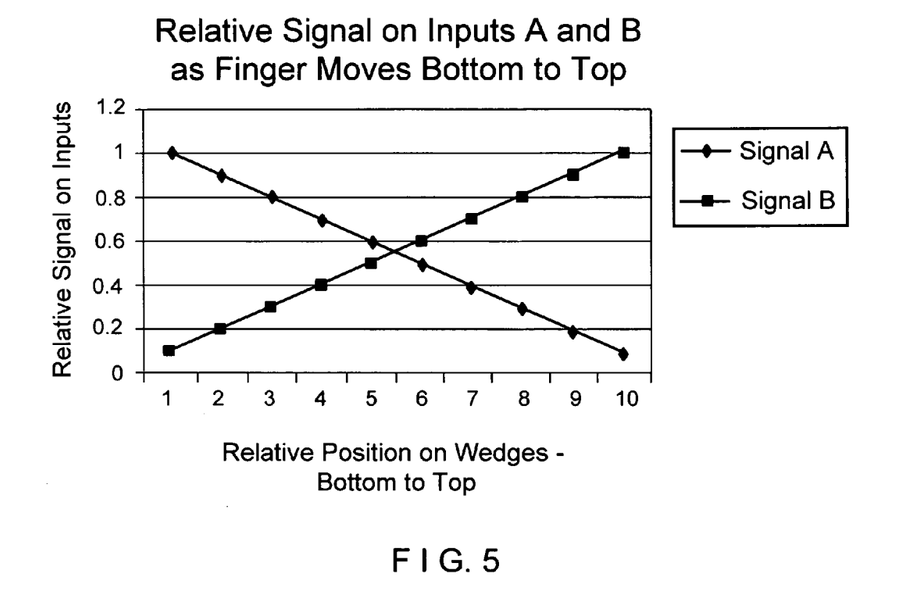
FIG. 5 is a graph showing the relative signal on the inputs to a differential amplifier according to the arrangement of FIG. 4 as a function of the position of a pointing object.

Now referring to FIG. 5, placing a finger near the bottom of the elements 82-112 results in covering a larger area of the conductive sensing elements 98-112 connected to input B and a smaller area of the conductive sensing elements 82-96 connected to input A. This results in interrupting the field lines coupling to B in a far greater amount than that for input A. The result is that the input signal to A is now greater than the input to B causing the resulting output of the differential amplifier to swing more positive (if input A is the positive input to the differential amplifier). As the operator's finger moves up along the rectangular shaped conductive sensing elements 82-112, the amount of coverage decreases on the conductors connected to B and increases on the conductors connected to A. The result is that the output of the amplifier 52 swings from negative to positive in a generally linear fashion as the finger moves from the bottom to top as illustrated in FIG. 5.

Figure 6:
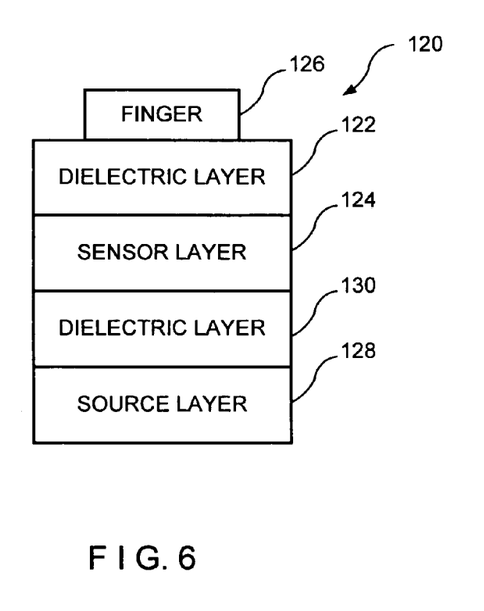
FIG. 6 illustrates a cross sectional diagram of a sensor arrangement of FIG. 2 in accordance with the invention.

FIG. 6 illustrates a cross sectional diagram of the sensing device 20, 30 arrangement of FIG. 1, in accordance with the invention. In the embodiment shown, the sensor system 120 consists of four layers: the top layer is a dielectric/insulating layer 122, isolating the sensor layer 124 below from the user's finger above 126. The second (sensor) layer 128 is again isolated from the bottom (source) layer by another dielectric/insulating layer 130. The layer structure may be in the form of a PC board, flexible PC board, insulating film printed with conductive ink or any other combination of conductors and dielectric layers.

A known AC oscillating voltage is applied to the source layer 128 which creates an electric field in the dielectric layers 122 and 130 above between the source layer and the sensor layer 124. Due to the gaps between the sensor conductors, the field extends through the sensor layer and also through the dielectric layer above. When a user's hand is placed above, it interferes with this electric field and causes a change in the current flowing from the source layer 128 to the sensor layer 124.

Figure 7:
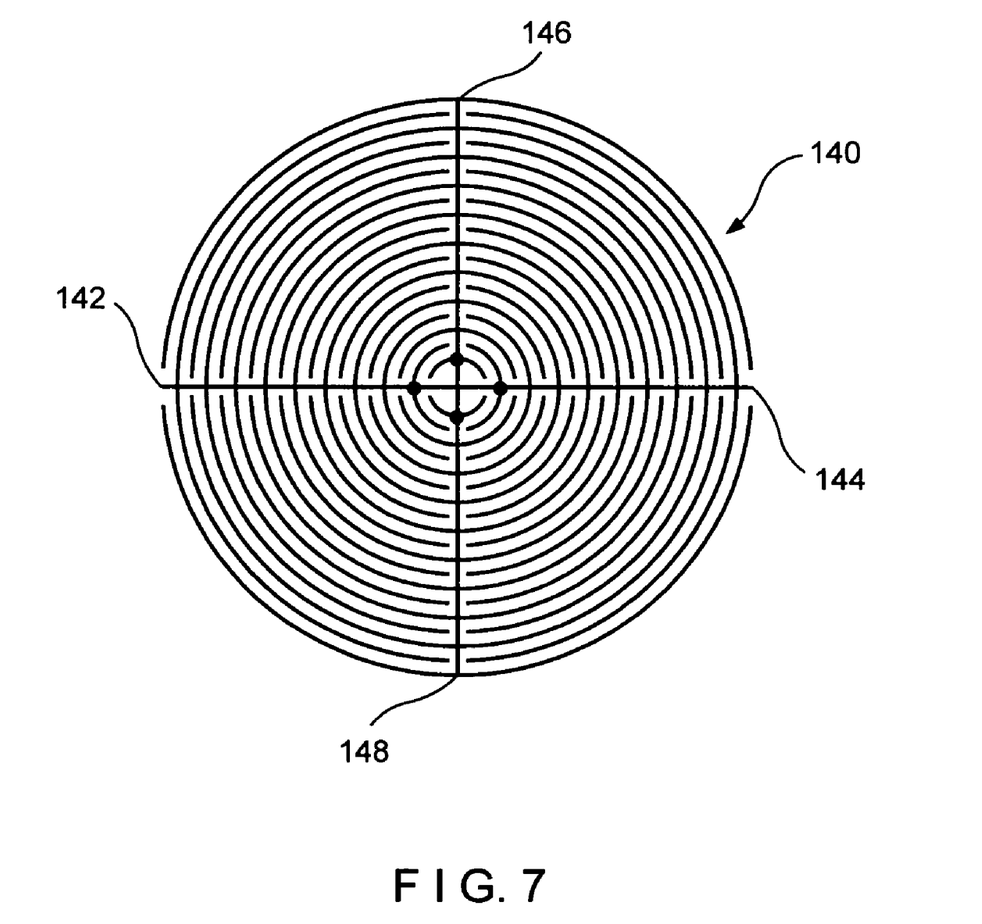
FIG. 7 shows the arrangement of conductive sensing elements according to another embodiment of the invention.

Now turning to FIG. 7, a sensor arrangement 140 contains curved conducting elements that are shaped in concentric semicircles with two separate sensors in both the X and the Y directions. A first set of complementary opposing concentric semi circles are joined together by thin interconnections 142,144 as inputs for x-direction and a second set of complementary opposing concentric semi circles, which are interleaved with the first set of semi circles but which do not contact the first set, are joined together by thin interconnections 146, 148 as inputs for y-direction. In the embodiment shown, the diameter of the sensor arrangement 140 is in the range of 30 millimeters. The source layer 128 may be a solid conductive plane or a grid or other shaped surface. As illustrated in FIG. 7, four sensor segments are connected close to the center of the sensor system 120. The X sensors are to the left and right and the Y sensors are at the top and bottom.

Figure 8:
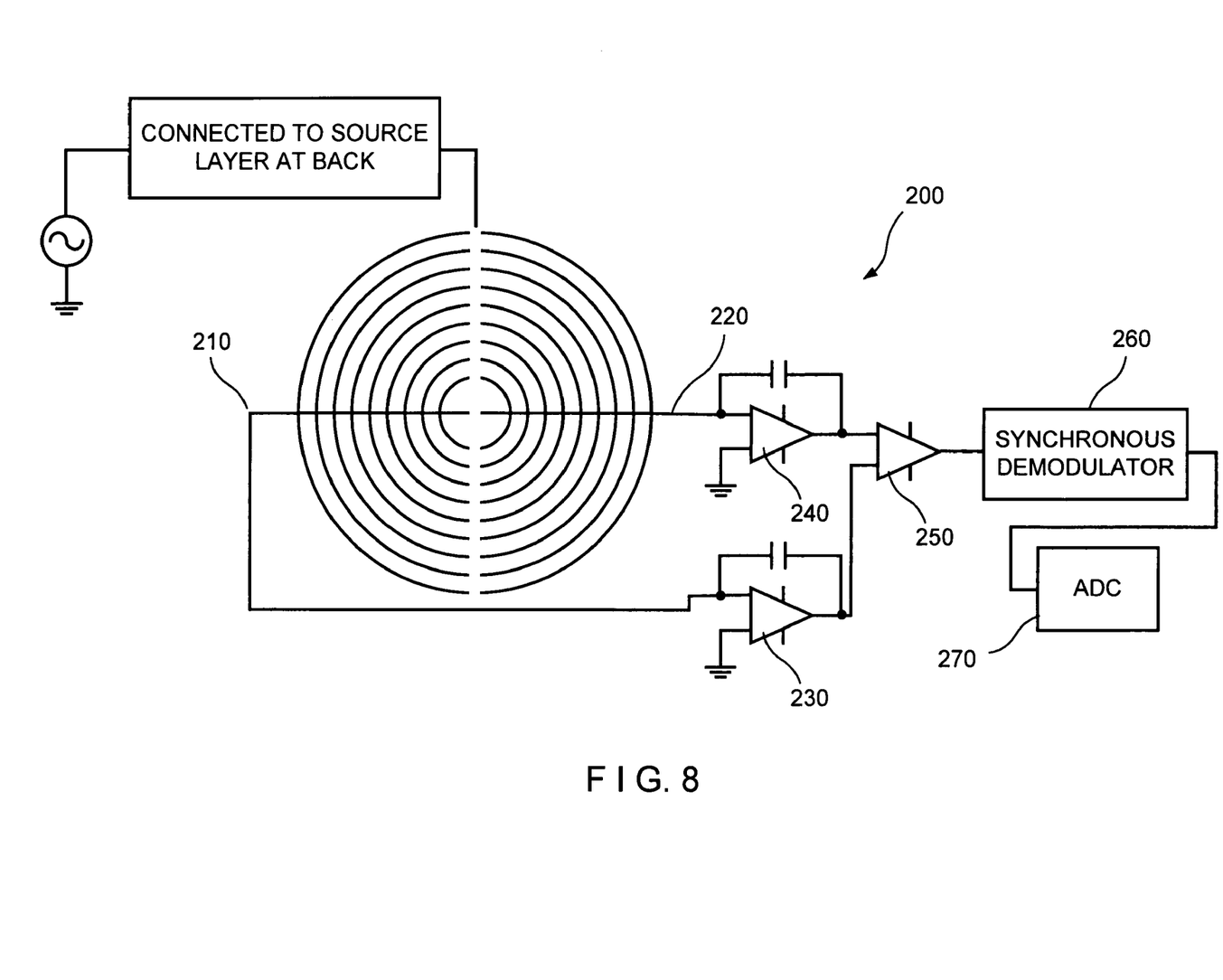
FIG. 8 illustrates the arrangement of the conductive sensing elements corresponding to the x-axis for the arrangement of FIG. 7.

FIG. 8 illustrates the sensor with only the x-axis connected conductive sensing elements. As shown, the left side positioned conductive sensing elements are inputted into the differential amplifier 230 and the right side positioned conductive sensing elements are inputted into differential amplifier 240. The output from amplifiers 230 and 240 are then transmitted into differential amplifier 250. A synchronous demodulator 260 then receives the input signal which removes the frequency components of the original oscillating signal which is then converted into a digital signal via an analog-to-digital converter 270.

Figure 9:
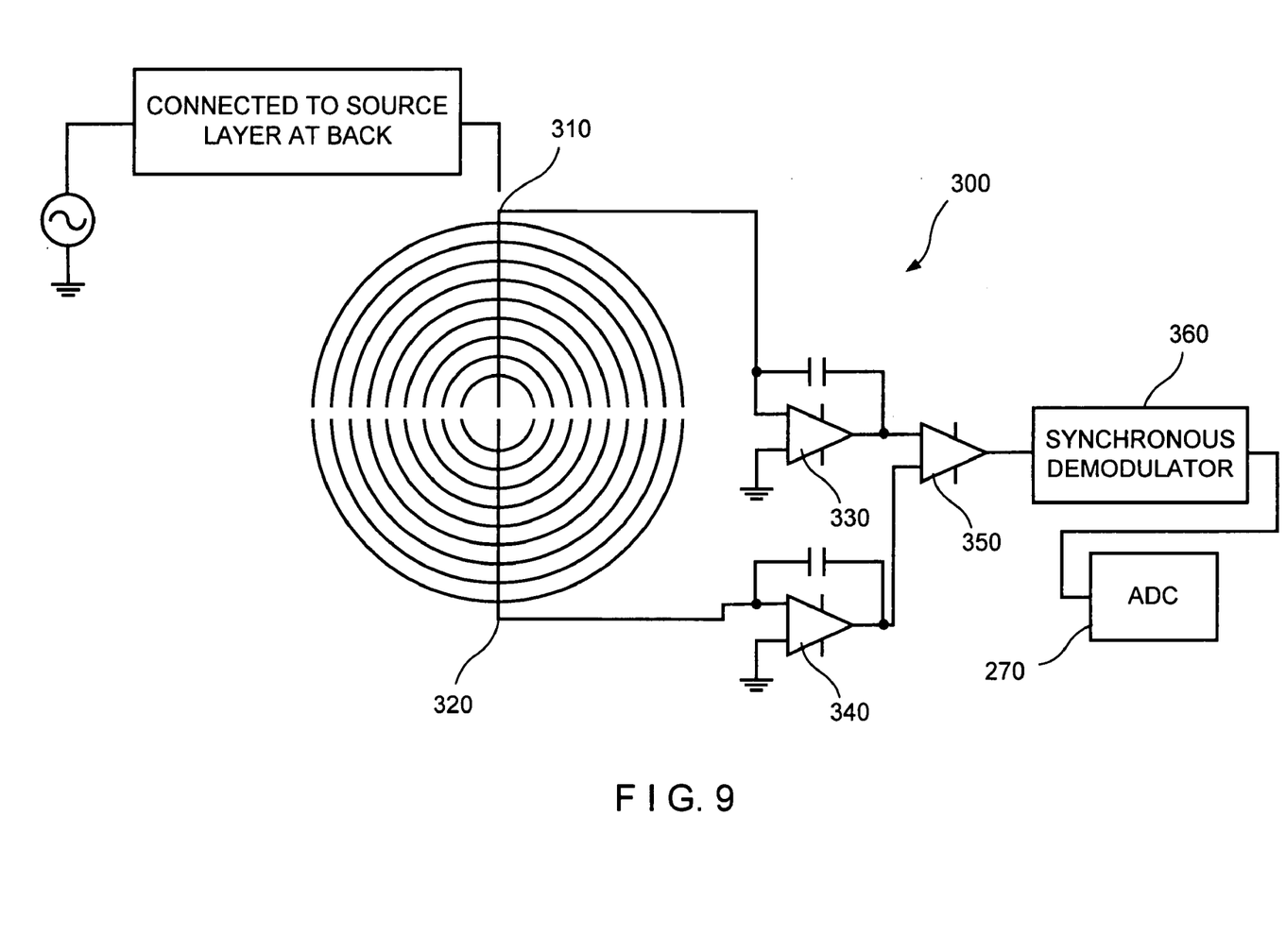
FIG. 9 illustrates the arrangement of the conductive sensing elements corresponding to the y-axis for the arrangement of FIG. 7.

Now looking at FIG. 9, a similar illustration is shown depicting the conductive sensing elements connected in a y-axis arrangement. The top portion of the conductive sensing elements is connected to electrode 310 and the bottom portion of the conductive sensing elements is connected to electrode 320. The signals received by electrode 310 are inputted into differential amplifier 330 and the signals received by electrode 320 are inputted into differential amplifier 340. The output from amplifiers 330 and 340 are then transmitted into differential amplifier 350. A synchronous demodulator 360 then receives the input signal which is then converted into a digital signal via the analog-to-digital converter 270.

Figure 10:
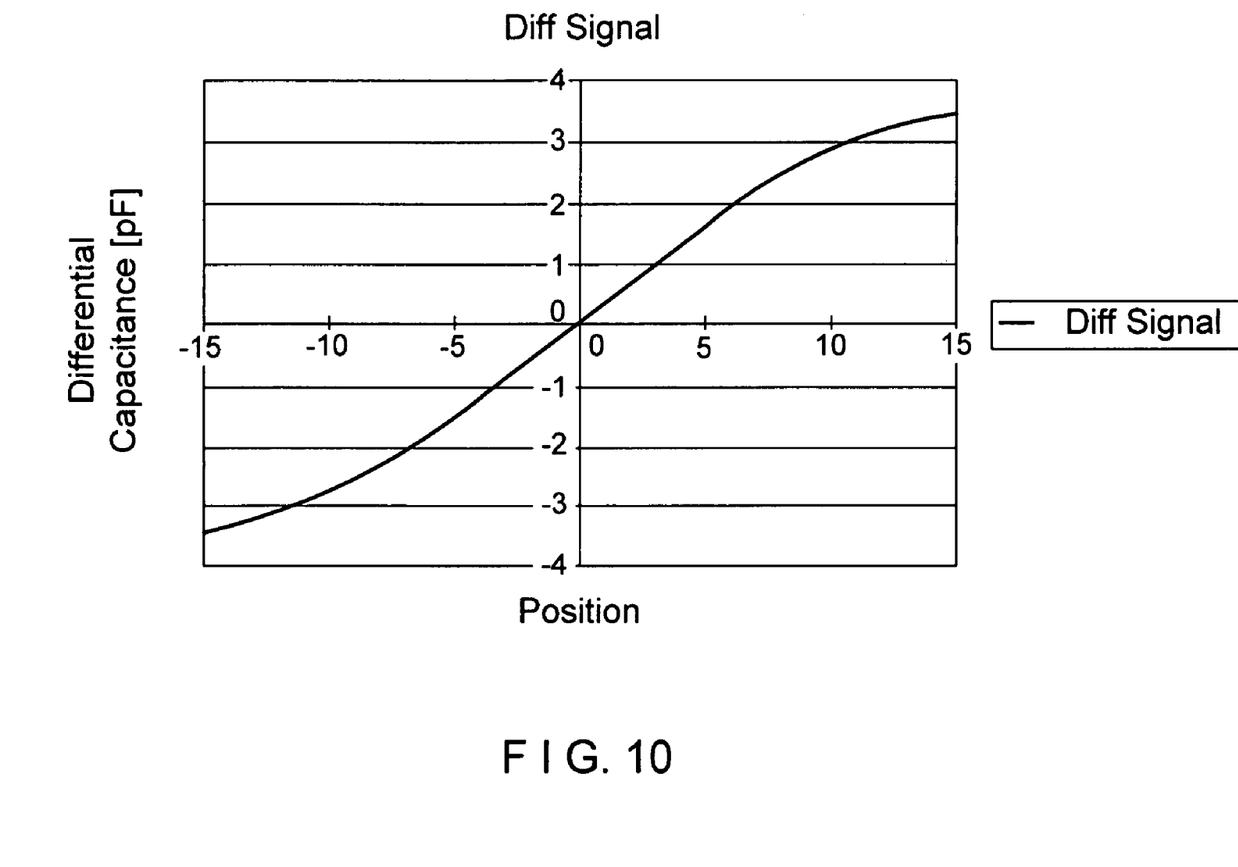
FIG. 10 is a graph showing the relative differential amplifier output versus the position of a pointing object according to the sensor arrangement of FIG. 7.

FIG. 10 illustrates a graph of a relative output of the synchronous demodulator 260 as a function if distance in millimeters. When a user places his finger on top of the sensor to cover a portion of the sensing elements, the field between the source and sensor is interrupted and the signal measured on the sensor is reduced. Thus, when the finger is placed to the left of center, the signal on the left hand X sensor is reduced more than that of the right hand sensor and the difference between these two signals is negative. As the finger is moved towards the right, the right hand X signal is reduced more and the left hand X signal is reduced less. The difference increases and when the finger is on the right hand side, the difference signal is approximately equal in magnitude, but opposite in sign from the case at the extreme left. The differential signal change with respect to position reaches a saturation level once the finger has moved completely away from one of the two sides. Thus, for example, if the diameter of the sensor arrangement 140 is 30 millimeters, a usable distance may be +10 millimeter and −10 millimeter from the origin/center as shown in FIG. 10. The saturation effect can be overcome; and thereby the linear range extended, by varying the spacing between the sensor segments.

The foregoing disclosure and description of the disclosed embodiments are illustrative and explanatory thereof, but to the extent foreseeable, the spirit and scope of the invention are defined by the appended claims.

What is claimed is:

1. A position sensing device comprising:
an insulating board;
a first conductive sensing element positioned on the insulating board;
a second conductive sensing element positioned on the insulating board and spaced from the first conductive sensing element;
conductive material spaced from the first and second conductive sensing elements and operable to receive an oscillating signal to create an oscillating electric field between the conductive material and the first and second conductive sensing elements in a non-contacting manner;
a differential amplifier having first and second differential inputs respectively connected to the first and second conductive sensing elements, a pointing object of a user disturbing the oscillating electric field being received by the first and second conductive sensing elements such that the signal levels at the first and second differential inputs vary according to the position of the pointing object relative to the first and second conductive sensing elements;
a processor operable to generate a position signal based on an output of the differential amplifier.

2. The position sensing device according to claim 1, wherein:
the first and second conductive sensing elements include a pair of conductive triangular wedges facing each other and lying in a plane.

3. The position sensing device according to claim 1, wherein:
the first conductive sensing element includes a plurality of spaced conductive pads that increase in size in a first direction and that are connected to each other;
the second conductive sensing element includes a plurality of spaced conductive pads that:
are alternately positioned with the conductive pads of the first conductive sensing element;
decrease in size in the first direction; and
are connected to each other.

4. The position sensing device according to claim 1, wherein:
the first conductive sensing element includes a first set of spaced curved conductors that are connected to each other;
the second conductive sensing element includes a second set of spaced curved conductors connected to each other and spaced from the first set.

5. The position sensing device according to claim 1, wherein:
the first conductive sensing element includes a first set of concentric circular conductors connected to each other;
the second conductive sensing element includes a second set of concentric circular conductors connected to each other and facing the first set; and the signal levels at the first and second differential inputs vary based on the portion of the first and second conductive sensing elements covered by the pointing object.

6. The position sensing device according to claim 5, further comprising:
a third conductive sensing element having a third set of concentric circular conductors connected to each other;
a fourth conductive sensing element having a fourth set of concentric circular conductors connected to each other and facing the third set; and
the first and second conductive sensing elements are intermixed in a non-contacting manner with the third and fourth conductive sensing elements substantially perpendicularly.

7. The position sensing device according to claim 1, further comprising a synchronous demodulator having an input connected to the differential amplifier to remove the frequency component of the oscillating signal.

8. A position sensing device comprising:
an insulating board;
a first conductive sensing element positioned on the insulating board;
a second conductive sensing element positioned on the insulating board and spaced from the first conductive sensing element;
conductive material spaced from the first and second conductive sensing elements and operable to receive an oscillating signal to create an oscillating electric field between the conductive material and the first and second conductive sensing elements;
a dielectric layer overlying the first and second conductive sensing elements; and
a comparator having first and second comparator inputs respectively connected to the first and second conductive sensing elements, a pointing object of the user disturbing the oscillating electric field and the first and second conductive sensing elements receiving the disturbed oscillating electric field without contacting each other such that the signal levels at the first and second comparator inputs vary according to the position of the pointing object relative to the first and second conductive sensing elements.

9. A method of determining a position of a pointing object comprising:
generating an oscillating signal;
receiving the oscillating signal in a conductive material spaced from first and second conductive elements to create an oscillating electric field with the first and second conductive sensing elements, a pointing object of a user disturbing the oscillating electric field and the first and second conductive sensing elements receiving the disturbed oscillating electric field;
receiving by inputs of a comparator first and second signals from the first and second conductive sensing elements without contacting each other such that the signal levels at the first and second comparator inputs vary according to the position of the pointing object relative to the first and second conductive sensing elements; the signal levels at the comparator inputs varying according to the position of the pointing object of the user relative to the first and second conductive sensing elements; and
generating a position signal based on an output of the comparator.

10. The position sensing device according to claim 1, wherein the conductive material is disposed on one side of the insulating board and the first and second conductive sensing elements are disposed on the other side of the insulating board.

11. The position sensing device according to claim 1, further comprising a dielectric layer overlying the first and second conductive sensing elements so as to prevent the pointing object from touching the first and second conductive sensing elements.

12. The position sensing device according to claim 1, wherein the first and second conductive sensing elements include a pair of conductive triangle-shaped sensing elements.

13. The position sensing device according to claim 1, wherein:
the first conductive sensing element includes a plurality of spaced conductive pads that increase in size in a first direction and that are connected to each other; and
the second conductive sensing element includes a plurality of spaced conductive pads that decrease in size in the first direction and that are connected to each other.

14. The position sensing device according to claim 1, wherein:
the first conductive sensing element includes a first set of concentric conductors connected to each other;
the second conductive sensing element includes a second set of concentric conductors connected to each other and facing the first set.

15. The position sensing device according to claim 14, further comprising:
a third conductive sensing element having a third set of concentric conductors connected to each other;
a fourth conductive sensing element having a fourth set of concentric conductors connected to each other and facing the third set.

16. The position sensing device according to claim 14, further comprising:
a third conductive sensing element having a third set of concentric conductors connected to each other; and
a fourth conductive sensing element having a fourth set of concentric conductors connected to each other and facing the third set;
wherein the first and second conductive sensing elements are intermixed in a non-contacting manner with the third and fourth conductive sensing elements.

17. The position sensing device according to claim 8, wherein:
the conductive material is disposed on one side of the insulating board and the first and second conductive sensing elements are disposed on the other side of the insulating board; and
the dielectric layer covers the first and second conductive sensing elements over the other side of the insulating board.

18. The position sensing device according to claim 8, wherein the first and second conductive sensing elements include a pair of conductive triangle-shaped sensing elements that face each other.

19. The position sensing device according to claim 8, wherein:
the first conductive sensing element includes a plurality of spaced conductive pads that increase in size in a first direction and that are connected to each other; and
the second conductive sensing element includes a plurality of spaced conductive pads that decrease in size in the first direction and that are connected to each other.

20. The position sensing device according to claim 8, wherein:
the first conductive sensing element includes a first set of concentric conductors connected to each other;
the second conductive sensing element includes a second set of concentric conductors connected to each other and facing the first set.

21. The position sensing device according to claim 20, wherein the first and second conductive sensing elements have a common center.

22. The position sensing device according to claim 20, further comprising:
a third conductive sensing element having a third set of concentric conductors connected to each other; and
a fourth conductive sensing element having a fourth set of concentric conductors connected to each other and facing the third set;
wherein the first and second conductive sensing elements are intermixed in a non-contacting manner with the third and fourth conductive sensing elements to provide a position indication in a first direction and a second direction perpendicular to the first direction.

23. The method according to claim 9, wherein the disturbed oscillating electric field is received by the first and second conductive sensing elements which include a pair of conductive triangle-shaped sensing elements that face each other.

24. The method according to claim 9, wherein the disturbed oscillating electric field is received by the first and second conductive sensing elements wherein:
the first conductive sensing element includes a plurality of spaced conductive pads that increase in size in a first direction and that are connected to each other; and
the second conductive sensing element includes a plurality of spaced conductive pads that decrease in size in the first direction and that are connected to each other.

25. The method according to claim 9, wherein the disturbed oscillating electric field is received by the first and second conductive sensing elements wherein:
the first conductive sensing element includes a first set of concentric conductors connected to each other;
the second conductive sensing element includes a second set of concentric conductors connected to each other and facing the first set.

26. The method according to claim 25, wherein the disturbed oscillating electric field is received by the first and second conductive sensing elements having a common center.

27. The position sensing device according to claim 25, wherein the disturbed oscillating electric field is received by the first and second conductive sensing elements, and by:
a third conductive sensing element having a third set of concentric conductors connected to each other; and
a fourth conductive sensing element having a fourth set of concentric conductors connected to each other and facing the third set;
wherein the first and second conductive sensing elements are intermixed in a non-contacting manner with the third and fourth conductive sensing elements to provide a position indication in a first direction and a second direction perpendicular to the first direction.

28. A position sensing device comprising:
an insulating board;
a first conductive sensing element positioned on the insulating board;

a second conductive sensing element positioned on the insulating board and spaced from the first conductive sensing element;
conductive material spaced from the first and second conductive sensing elements and operable to receive an oscillating signal to create an electric field between the conductive material and the first and second conductive sensing elements;
a differential amplifier having first and second differential inputs respectively connected to the first and second conductive sensing elements, the signal levels at the differential inputs varying according to the position of a pointing object of a user relative to the first and second conductive sensing elements;
a processor operable to generate a position signal based on an output of the differential amplifier;
wherein the first and second conductive sensing elements include a pair of elongated conductive triangular wedges facing each other and lying in a plane.

29. A position sensing device comprising:
an insulating board;
a first conductive sensing element positioned on the insulating board;
a second conductive sensing element positioned on the insulating board and spaced from the first conductive sensing element;
conductive material spaced from the first and second conductive sensing elements and operable to receive an oscillating signal to create an electric field between the conductive material and the first and second conductive sensing elements;
a differential amplifier having first and second differential inputs respectively connected to the first and second conductive sensing elements, the signal levels at the differential inputs varying according to the position of a pointing object of a user relative to the first and second conductive sensing elements;
a processor operable to generate a position signal based on an output of the differential amplifier;
wherein:
the first conductive sensing element includes a plurality of spaced conductive pads that increase in size in a first direction and that are connected to each other;
the second conductive sensing element includes a plurality of spaced conductive pads that:
are alternately positioned with the conductive pads of the first conductive sensing element;
decrease in size in the first direction; and
are connected to each other.

30. A position sensing device comprising:
an insulating board;
a first conductive sensing element positioned on the insulating board;
a second conductive sensing element positioned on the insulating board and spaced from the first conductive sensing element;
conductive material spaced from the first and second conductive sensing elements and operable to receive an oscillating signal to create an electric field between the conductive material and the first and second conductive sensing elements;
a differential amplifier having first and second differential inputs respectively connected to the first and second conductive sensing elements, the signal levels at the differential inputs varying according to the position of a pointing object of a user relative to the first and second conductive sensing elements;
a processor operable to generate a position signal based on an output of the differential amplifier;
wherein:
the first conductive sensing element includes a first set of spaced curved conductors that are connected to each other;
the second conductive sensing element includes a second set of spaced curved conductors connected to each other and spaced from the first set.

31. A position sensing device comprising:
an insulating board;
a first conductive sensing element positioned on the insulating board wherein the first conductive sensing element includes a first set of concentric circular conductors connected to each other;
a second conductive sensing element positioned on the insulating board and spaced from the first conductive sensing element wherein the second conductive sensing element includes a second set of concentric circular conductors connected to each other and facing the first set;
conductive material spaced from the first and second conductive sensing elements and operable to receive an oscillating signal to create an electric field between the conductive material and the first and second conductive sensing elements;
a differential amplifier having first and second differential inputs respectively connected to the first and second conductive sensing elements, the signal levels at the differential inputs varying according to the position of a pointing object of a user relative to the first and second conductive sensing elements;
a processor operable to generate a position signal based on an output of the differential amplifier;
a third conductive sensing element having a third set of concentric circular conductors connected to each other;
a fourth conductive sensing element having a fourth set of concentric circular conductors connected to each other and facing the third set;
wherein:
the signal levels at the differential inputs vary based on the portion of the first and second conductive sensing elements covered by the pointing object; and
the first and second conductive sensing elements are intermixed in a non-contacting manner with the third and fourth conductive sensing elements substantially perpendicularly.

* * * * *